(12) United States Patent
Wada (10) Patent No.: US 8,287,138 B2
(45) Date of Patent: Oct. 16, 2012

(54) LIGHT SOURCE DEVICE AND PROJECTION DISPLAY DEVICE USING THE SAME

(75) Inventor: Mitsuhiro Wada, Kyoto (JP)

(73) Assignee: Panasonic Corporation, Osaka (JP)

( * ) Notice: Subject to any disclaimer, the term of this patent is extended or adjusted under 35 U.S.C. 154(b) by 388 days.

(21) Appl. No.: 12/665,553

(22) PCT Filed: Jun. 17, 2008

(86) PCT No.: PCT/JP2008/001553
§ 371 (c)(1),
(2), (4) Date: Dec. 18, 2009

(87) PCT Pub. No.: WO2008/155899
PCT Pub. Date: Dec. 24, 2008

(65) Prior Publication Data
US 2010/0195059 A1    Aug. 5, 2010

(30) Foreign Application Priority Data

Jun. 21, 2007  (JP) ................................ 2007-163494

(51) Int. Cl.
*G03B 21/28* (2006.01)
(52) U.S. Cl. ............. 353/94; 353/99; 362/234; 362/247
(58) Field of Classification Search .................... 353/94, 353/98, 99; 362/234, 241, 243, 247, 297, 362/298, 301, 302
See application file for complete search history.

(56) References Cited

U.S. PATENT DOCUMENTS

| 4,305,099 A | 12/1981 | True et al. |
| 4,686,612 A | 8/1987 | Pringle et al. |
| 5,491,525 A | 2/1996 | Yamasaki et al. |
| 6,431,727 B1 | 8/2002 | Sugawara et al. |

(Continued)

FOREIGN PATENT DOCUMENTS

JP       6-289394       10/1994

(Continued)

*Primary Examiner* — William C Dowling
(74) *Attorney, Agent, or Firm* — Hamre, Schumann, Mueller & Larson, P.C.

(57) ABSTRACT

First and second lamps 1, 2, first and second ellipsoidal mirrors 3, 4, first and second spherical mirrors 5, 6, and a plane mirror 7 are provided. The first spherical mirror 5 is provided on the same side as the first ellipsoidal mirror 3 with respect to the lamp 1, and the second spherical mirror 6 is provided on the opening side of the second ellipsoidal mirror 4 with respect to the second lamp 2, so that they reflect a respective part of light beams emitted from the first and second lamps toward the first and second ellipsoidal mirrors 3, 4. The first and second ellipsoidal mirrors are arranged such that the optical axes of their reflected light beams intersect with each other, so that they condense respective light beams emitted from the first and second lamps and respective light beams reflected at the first and second spherical mirrors 5 and 6. The plane mirror 7 reflects at a reflective film 7a, light beams condensed by the first ellipsoidal mirror 3, and transmits via a light-transmitting portion 5 where no reflective film is provided, light beams condensed by the second ellipsoidal mirror 4; accordingly, light beams emitted from the first and second lamps are combined so as to become light beams travelling coaxially and in the same direction. This can reduce the optical loss when combining light beams emitted from a plurality of lamps.

13 Claims, 5 Drawing Sheets

U.S. PATENT DOCUMENTS

| | | | |
|---|---|---|---|
| 6,488,379 B2 * | 12/2002 | Kane | 353/94 |
| 7,055,967 B2 * | 6/2006 | Bierhuizen | 353/98 |
| 7,854,519 B2 * | 12/2010 | Akiyama | 353/99 |
| 8,066,388 B2 * | 11/2011 | Yeh et al. | 353/94 |
| 2002/0048172 A1 | 4/2002 | Wada et al. | |
| 2002/0149750 A1 * | 10/2002 | Kane | 353/94 |
| 2004/0246451 A1 | 12/2004 | Fujisawa et al. | |
| 2006/0146296 A1 * | 7/2006 | Lin | 353/94 |
| 2006/0171150 A1 | 8/2006 | Shimaoka | |
| 2006/0198139 A1 | 9/2006 | Cheng | |

FOREIGN PATENT DOCUMENTS

| | | |
|---|---|---|
| JP | 2000-003612 A | 1/2000 |
| JP | 2000-137290 A | 5/2000 |
| JP | 2000-194069 A | 7/2000 |
| JP | 2000-347589 | 12/2000 |
| JP | 2001-027781 A | 1/2001 |
| JP | 2001027781 * | 1/2001 |
| JP | 2006-092910 A | 4/2006 |
| WO | 2005/008329 | 1/2005 |

* cited by examiner

LIGHT SOURCE DEVICE AND PROJECTION DISPLAY DEVICE USING THE SAME

TECHNICAL FIELD

The present invention relates to a light source device that can be used for illuminating, for example, an image forming means, and to a projection display device in which an optical image formed on an image forming means is illuminated by using such a light source device to project the optical image on a screen using a projection lens.

BACKGROUND ART

As one system for displaying a large-screen image, projection display devices are known that use, as an image forming means, a small-sized spatial light modulation element that forms an optical image in accordance with a video signal, and such an optical image is illuminated to project the optical image in a magnified state using a projection lens. And, projection display devices such as a projector, that use a liquid crystal panel as a spatial light modulation element, have been put into practical use. For such projection display devices, there is a strong need to increase the brightness of projected images, and in order to meet such a need a projection display device that includes a light source device configured with a plurality of lamps is disclosed in Patent Document 1, for example.

Figure 6:
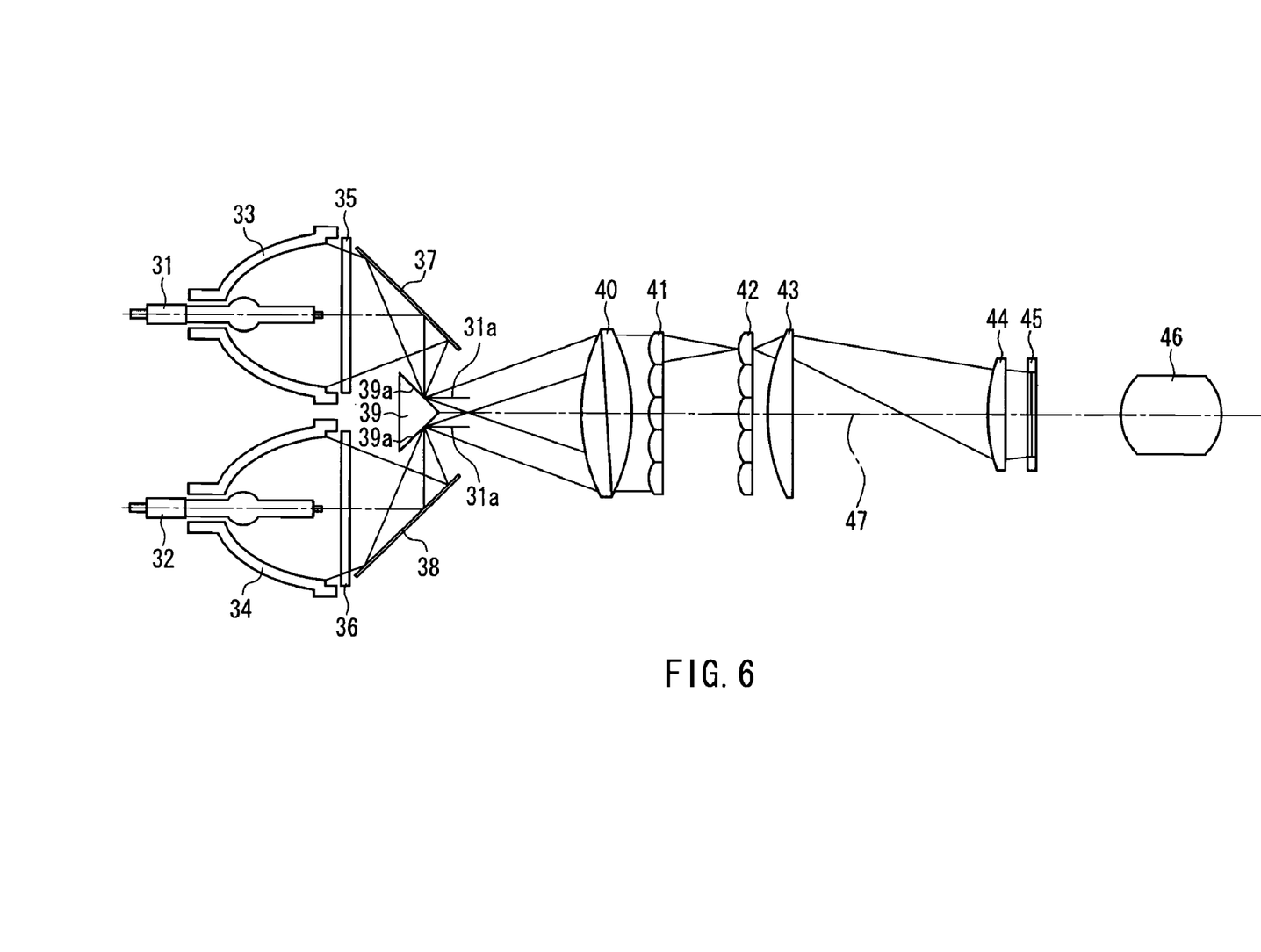
FIG. 6 is a cross-sectional view schematically showing the configuration of an exemplary conventional light source device.

FIG. 6 shows a configuration example of such a projection display device. This projection display device includes discharge lamps 31 and 32, ellipsoidal mirrors 33 and 34, UV-IR cut-off filters 35 and 36, plane mirrors 37 and 38, a reflecting prism 39, a condenser lens 40, a first lens array 41, a second lens array 42, a beam-combining lens 43, a field lens 44, a liquid crystal panel 45, and a projection lens 46.

Metal halide lamps, ultra-high pressure mercury lamps, xenon lamps, or the like may be used as the discharge lamps 31 and 32. Light beams emitted from the lamps 31 and 32 are condensed with the respective ellipsoidal mirrors 33 and 34, and the ultraviolet light and infrared light components are removed with the UV-IR cut-off filters 35 and 36 before their optical paths are bent by the plane mirrors 37 and 38. The reflecting prism 39 is disposed in the vicinity of second focal points of the ellipsoidal mirrors 33 and 34. Consequently, the condensed light spots of the lamps 31 and 32 are formed in the vicinity of reflection planes 39a of the reflecting prism 39.

The reflection planes 39a of the reflecting prism 39 are provided with an aluminum film or a dielectric multilayer film vapor-deposited thereon, at which visible light is reflected efficiently. Light reflected at the reflecting prism 39 is divergent light, and is incident on the condenser lens 40. As the condenser lens 40, it is possible to use, for example, an aspherical double-convex lens, which converts the incident light into substantially parallel light.

Bundles of parallel light from the condenser lens 40 are incident on the first lens array 41 including a plurality of lenses, and are split into a large number of minute light beams. The large number of minute light beams converge onto their respective corresponding lenses of the second lens array 42 including a plurality of lenses. Accordingly, a large number of images of the lamps 31 and 32 are formed on the second lens array 42. The second lens array 42 has the same shape as the first lens array 41.

Each of the rectangular lenses of the second lens array 42 magnifies the minute light beams incident on the surface of the corresponding rectangular lens of the first lens array 41, and thereby, the surface of the liquid crystal panel 45 is illuminated. The beam-combining lens 43 is used to superpose the light beams exiting from the rectangular lenses of the second lens array 42 on the liquid crystal panel 45.

By splitting the light beams incident on the first lens array 41 into a large number of minute light beams, and superposing the light beams in a magnified state on the liquid crystal panel 45, it is possible to illuminate the surface of the liquid crystal panel 45 with good uniformity.

The field lens 44 is used to condense the light illuminating the surface of the liquid crystal panel 45 onto the pupil plane of the projection lens 46. The projection lens 46 projects an optical image formed on the liquid crystal panel 45 onto a screen (not shown).

With the above-described configuration, the liquid crystal panel 45 is illuminated with the plurality of lamps 31 and 32, so that it is possible to configure a projection display device with a bright light source for illumination.

[Patent Document 1] JP2000-003612A

DISCLOSURE OF INVENTION

Problem to be Solved by the Invention

With the above-described conventional configuration, the light beams emitted from the plurality of lamps 31 and 32 are combined using the reflecting prism 39. However, the optical axes of the lamps 31 and 32 cannot be coaxially combined with such a combining method. That is, with the configuration of FIG. 6, the optical axes 31a and 32a of the lamps 31 and 32 cannot be coaxially combined with respect to an optical axis 47 after combination. This results in the problem of an increased optical loss in the optical system after combination.

When light beams that are output from two lamps are combined, the combined optical output will be double that of one lamp, if there is no combining loss at all. In general, the combined optical output is, however, about 1.5 times to 1.6 times that of one lamp.

The present invention was made in view of the foregoing problems, and it is an object of the invention to provide a light source device with a high optical output achieved by reducing the combining loss when using a plurality of lamps. It is another object of the invention to provide a projection display device capable of displaying a bright projected image using such a light source device.

Means for Solving Problem

In order to solve the above-described problems, a light source device according to the present invention includes: first and second lamps; first and second concave mirrors provided corresponding respectively to the first and second lamps; third and fourth concave mirrors provided correspondingly respectively to the first and second lamps; and a plane mirror disposed between the first and second lamps.

The third concave mirror is provided on the same side as the first concave mirror with respect to a light source center of the first lamp, and reflects a part of light emitted from the first lamp toward the first concave mirror. The fourth concave mirror is provided on an opening side of the second concave mirror with respect to a light source center of the second lamp, and reflects a part of light emitted from the second lamp toward the second concave mirror. The first concave mirror condenses light emitted from the first lamp and light reflected at the third concave mirror, and the second concave mirror condenses light emitted from the second lamp and light reflected at the fourth concave mirror. The first concave mirror and the second concave mirror are arranged such that optical axes of reflected light beams thereof intersect with each other. The plane mirror either reflects light exiting from the first concave mirror, while transmitting light exiting from the second concave mirror, or transmits light exiting from the first concave mirror, while reflecting light exiting from the second concave mirror, and light beams exiting from the first and second concave mirrors are combined by the plane mirror so as to become light beams travelling coaxially and in the same direction.

Effects of the Invention

With the above-described configuration, even if a plurality of lamps are used, the optical axes of the lamps can be substantially coaxially combined. Accordingly, the optical loss during combination is reduced, so that it is possible to configure a light source device with increased light utilization efficiency.

DESCRIPTION OF REFERENCE NUMERALS 1, 11 First lamp
2, 12 Second lamp
1a, 2a, 11a, 12a Light emission center
1b, 2b, 11b, 12b Optical axis
1c Arc tube
1d Reflective film
3 First ellipsoidal mirror
4 Second ellipsoidal mirror
3a, 4a First focal point
3b, 4b Second focal point
5 First spherical mirror
6 Second spherical mirror
5a, 6a Center
7, 17, 21 Plane mirror
7a, 17a, 20a Reflective film
7b, 17b Light-transmitting portion
13 First parabolic mirror
14 Second parabolic mirror
13a, 14a First focal point
15 First aspherical mirror
16 Second aspherical mirror
15a, 16a Center
18 First light source unit
19 Second light source unit
18a, 19a Exiting light
20 Light-combining unit
22 Light source device
23 Illumination device
24 Rotating color filter
25, 40 Condenser lens
26, 44 Field lens
27 Spatial light modulation element
28, 46 Projection lens
31, 32 Discharge lamp
33, 34 Ellipsoidal mirror
35, 36 UV-IR cut-off filter
37, 38 Plane mirror
39 Reflecting prism
41 First lens array
42 Second lens array
43 Beam-combining lens
45 Liquid crystal panel

DESCRIPTION OF THE INVENTION

Based on the above-described configuration, the light source device according to the present invention can be embodied as described below.

That is, the first and second concave mirrors can be configured with ellipsoidal mirrors. Alternatively, the first and second concave mirrors can be configured with parabolic mirrors. It is preferable that the first and second concave mirrors each have a reflection plane having an aspherical shape.

When the first and second lamps are discharge lamps, it is preferable to adopt a configuration in which an arc tube constituting each of the discharge lamps has an outer surface having an aspherical shape.

When the first and second lamps are discharge lamps, the third and fourth concave mirrors each can be configured with a reflective film vapor-deposited on an outer surface of an arc tube constituting each of the discharge lamps.

The third and fourth concave mirrors can be configured with spherical mirrors. The third and fourth concave mirrors can be configured each to have a reflection plane having an aspherical shape.

It is preferable that a light emission center of the first lamp, a first focal point of the first concave mirror and a center of the third concave mirror coincide together, and a light emission center of the second lamp, a first focal point of the second concave mirror and a center of the fourth concave mirror coincide together.

The first and second concave mirrors can be configured to have second focal points that coincide with each other.

It is possible to adopt a configuration that includes a plurality of light source units each configured as any of the above-described light source devices; and that further includes a light-combining unit that combines light beams exiting from the plurality of light source units so as to become light beams traveling in the same direction. In that case, the light-combining unit can be configured with a prism.

A projection display device according to the present invention includes: any of the light source devices configured as described above; an illumination device that condenses light exiting from the light source device, thereby forming illumination light; a spatial light modulation element on which the illumination light is incident, and that modulates the incident light in accordance with a video signal; and a projection lens that projects light that has been modulated with the spatial light modulation element onto a screen. This makes it possible to illuminate the spatial light modulation element with light having a relatively high intensity, thereby increasing the brightness of a projected image. Furthermore, even if, for some reason, one lamp does not illuminate, it is possible to realize a projection display device that has little non-uniformity in color and brightness.

Hereinafter, embodiments of the light source device and the projection display device according to the present invention will be specifically described with reference to the drawings.

Embodiment 1

Figure 1:
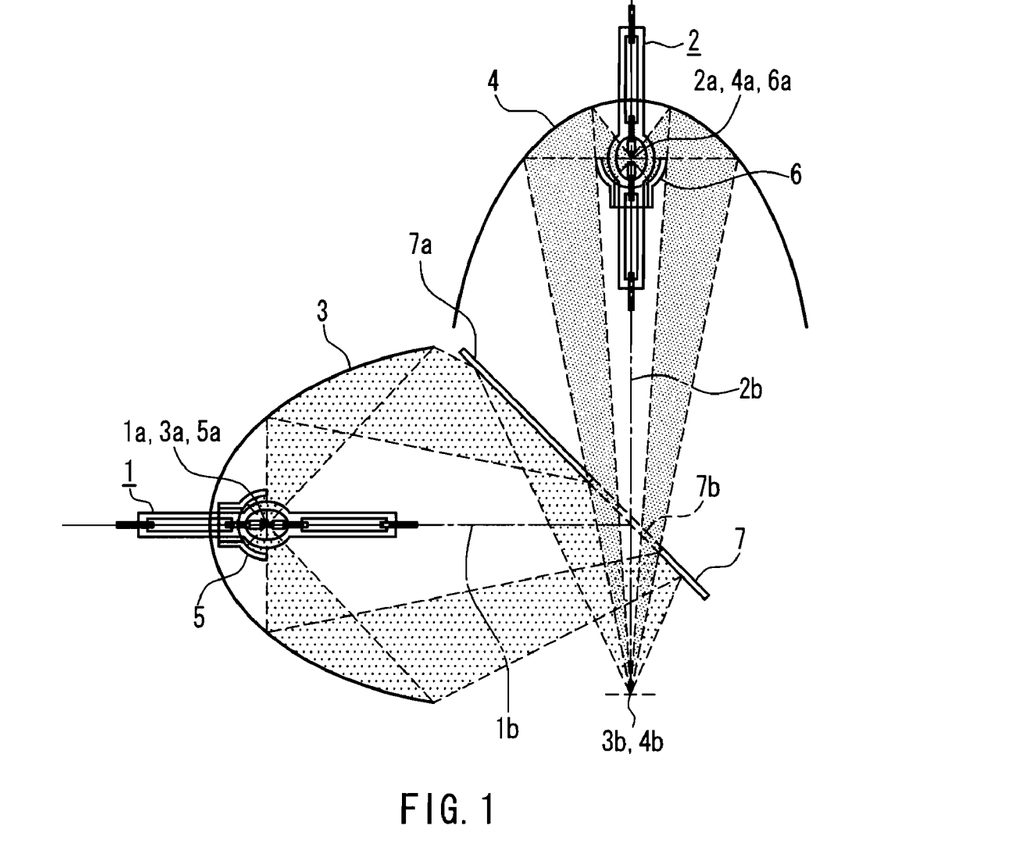
FIG. 1 is a cross-sectional view schematically showing the configuration of a light source device according to Embodiment 1 of the present invention.

FIG. 1 is a cross-sectional view showing the configuration of a light source device according to Embodiment 1. This light source device includes first and second lamps 1 and 2, first and second ellipsoidal mirrors 3 and 4 (first and second concave mirrors), first and second spherical mirrors 5 and 6 (third and fourth concave mirrors), and a plane mirror 7.

The first lamp 1, the first ellipsoidal mirror 3 and the first spherical mirror 5 make up a unit that condenses the light emitted from the first lamp 1. As the first lamp 1, it is possible to use an ultra-high pressure mercury lamp. An ultra-high pressure mercury lamp has a very high luminance and excellent light-condensing properties, so that light emitted therefrom can be condensed efficiently.

The first ellipsoidal mirror 3 has, for example, a first focal point (short focal point) 3a of a focal length F1=10 mm, and a second focal point (long focal point) 3b of a focal length F2=100 mm. For example, the reflection plane of the first ellipsoidal mirror 3 is provided with a dielectric multilayer film that efficiently reflects visible light and transmits infrared light, so as to reflect efficiently the visible light component contained in the light emitted from the first lamp 1 in the desired direction.

The first lamp 1 is disposed such that its light emission center 1a coincides substantially with the first focal point 3a of the first ellipsoidal mirror 3. This allows a condensed light spot of a size proportional to the size of the light source to be formed in the vicinity of the second focal point 3b of the first ellipsoidal mirror 3, so that the light emitted from the first lamp 1 can be condensed efficiently.

The first spherical mirror 5 is provided on the same side as the first ellipsoidal mirror 3, with respect to the light emission center 1a of the first lamp 1. The first spherical mirror 5 has a center 5a located so as to coincide substantially with the light emission center 1a, and reflects light beams emitted from the first lamp 1 that have an emission angle within the range of 90 degrees. Consequently, of the light beams emitted from the first lamp 1, those light beams incident on the first spherical mirror 5 are reflected, so as to be incident on the first ellipsoidal mirror 3.

Similarly, the second lamp 2, the second ellipsoidal mirror 4 and the second spherical mirror 6 make up a unit that condenses the light emitted from the second lamp 2. As the second lamp 2, it is possible to use the same ultra-high pressure mercury lamp as the first lamp 1. As the second ellipsoidal mirror 4 and the second spherical mirror 6, it is possible to use the same ellipsoidal mirror and spherical mirror as the first ellipsoidal mirror 3 and the first spherical mirror 5.

The second lamp 2 is disposed such that its light emission center 2a coincides substantially with a first focal point 4a of the second ellipsoidal mirror 4. This allows a condensed light spot of a size proportional to the size of the light source to be formed in the vicinity of a second focal point 4b of the second ellipsoidal mirror 4, so that the light emitted from the second lamp 2 can be condensed efficiently.

The second spherical mirror 6 is provided on the opposite side from the second ellipsoidal mirror 4, with respect to the light emission center 2a of the second lamp 2, that is, on the opening side of the second ellipsoidal mirror 4. The second spherical mirror 6 has a center 6a located so as to coincide substantially with the light emission center 2a, and reflects light beams emitted from the second lamp 2 that have an emission angle within the range of 90 degrees. Consequently, of the light beams emitted from the second lamp 2, those light beams incident on the second spherical mirror 6 are reflected, so as to be incident on the second ellipsoidal mirror 4.

With the above-described configuration, the first ellipsoidal mirror 3 condenses the light emitted from the first lamp 1 and the light reflected at the first spherical mirror 5. Similarly, the second ellipsoidal mirror 4 condenses the light emitted from the second lamp 2 and the light reflected at the second spherical mirror 6. In addition, due to the difference in configuration between the first spherical mirror 5 and the second spherical mirror 6, light that has been condensed by the first ellipsoidal mirror 3 is distributed over a range of larger angles to the optical axis, as compared with light that has been condensed by the second ellipsoidal mirror 4, as shown in the drawing.

The first ellipsoidal mirror 3 and the second ellipsoidal mirror 4 are arranged such that the optical axes of their reflected light beams intersect with each other at a predetermined angle. In the example shown in FIG. 1, the optical axis 1b of the first lamp 1 and the optical axis 2b of the second lamp 2 are substantially orthogonal. The position at which the optical axes 1b and 2b intersect (intersection point) is located at a substantially equal distance from the first and second lamps 1 and 2. At the intersection point of the optical axes 1b and 2b, the plane mirror 7 is disposed so that it is inclined in a direction at substantially 45 degrees relative to the optical axes 1b and 2b.

A reflective film 7a is vapor-deposited on the plane mirror 7, and the light exiting from the first ellipsoidal mirror 3 is reflected at the plane mirror 7, so that the optical axis 1b is bent in a direction at substantially 90 degrees.

On the other hand, a light-transmitting portion 7b where the reflective film 7a is not vapor-deposited is provided at a part of the plane mirror 7, and the light exiting from the second ellipsoidal mirror 4 is transmitted through the light-transmitting portion 7b.

With the above-described configuration, the light beams exiting from the first ellipsoidal mirror 3 and the second ellipsoidal mirror 4 are combined so as to become light beams travelling substantially coaxially and in substantially the same direction, so that it is possible to make their respective second focal points 3b and 4b coincide with each other. Accordingly, the optical loss associated with the combination can be reduced, making it possible to combine and condense the light beams emitted from the first and second lamps 1 and 2 with very high efficiency.

In addition, it is preferable that the reflection regions of the first and second spherical mirrors 5 and 6 have an emission angle of 90 degrees or less, relative to the light beams emitted from the first and second lamps 1 and 2.

Figure 2:
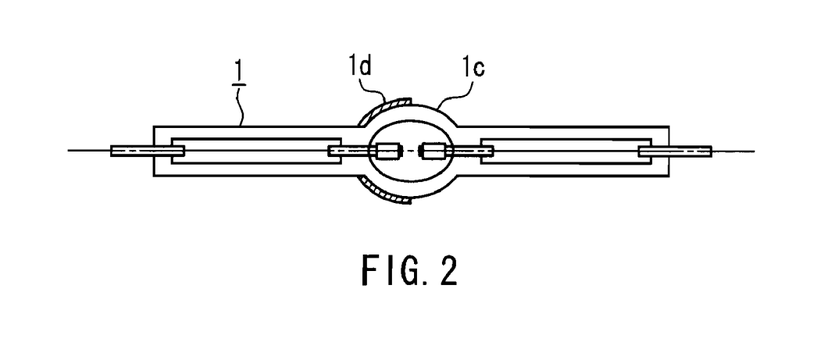
FIG. 2 is a cross-sectional view schematically showing the configuration of a lamp used for the above-mentioned light source device.

It is also possible to adopt a configuration as shown in FIG. 2 in which a spherical mirror is provided by vapor-depositing a reflective film 1d directly onto the outer surface of an arc tube 1c of the lamp 1, instead of providing the first spherical mirror 5. This also applies to the second lamp 2.

Furthermore, when the reflection planes of the first ellipsoidal mirror 3 and the second ellipsoidal mirror 4 have an aspherical shape, it is possible to reflect light more efficiently.

It is not essential for the optical axis 1b of the first lamp 1 and the optical axis 2b of the second lamp 2 to be substantially orthogonal as in the above-described configuration. There is no limitation on the intersecting angle, and an intersecting angle can be set appropriately by adjusting the inclination of the plane mirror 7 disposed between the first and second lamps 1 and 2, depending on that intersecting angle. In other words, the plane mirror 7 need only be disposed on a plane of symmetry of the optical axis 1b of the first lamp 1 and the optical axis 2b of the second lamp 2.

Furthermore, it is not essential for the first lamp 1 and the second lamp 2, the first ellipsoidal mirror 3 and the second ellipsoidal mirror 4, as well as the first spherical mirror 5 and the second spherical mirror 6, respectively, to be the same. Each of these pairs may not be the same as long as a setting is made such that the positions of the second focal points coincide.

Furthermore, it is not essential for the plane mirror 7 to be configured to reflect the light exiting from the first ellipsoidal mirror 3, and to transmit the light exiting from the second ellipsoidal mirror 4. It is also possible to change the deposition area of the reflective film 7a such that the light exiting from the first ellipsoidal mirror 3 is transmitted through, and the light exiting from the second ellipsoidal mirror 4 is reflected.

Furthermore, the plane mirror 7 may be provided with an opening, in place of the light-transmitting portion 7b, which is the part of the plane mirror 7 where the reflective film 7a is not vapor-deposited. In the case where the reflection and transmission of the light exiting from the first ellipsoidal mirror 3 and the light exiting from the second ellipsoidal mirror 4 are reversed as described above, the plane mirror 7 with a reduced size may be 1 sed. Namely, it is sufficient for the exiting light to pass (i.e., to be transmitted) through, without being reflected.

As has been described above, according to this embodiment, it is possible to realize a light source device having a high optical output by combining and condensing light beams emitted from a plurality of lamps with good efficiency Embodiment 2

Figure 3:
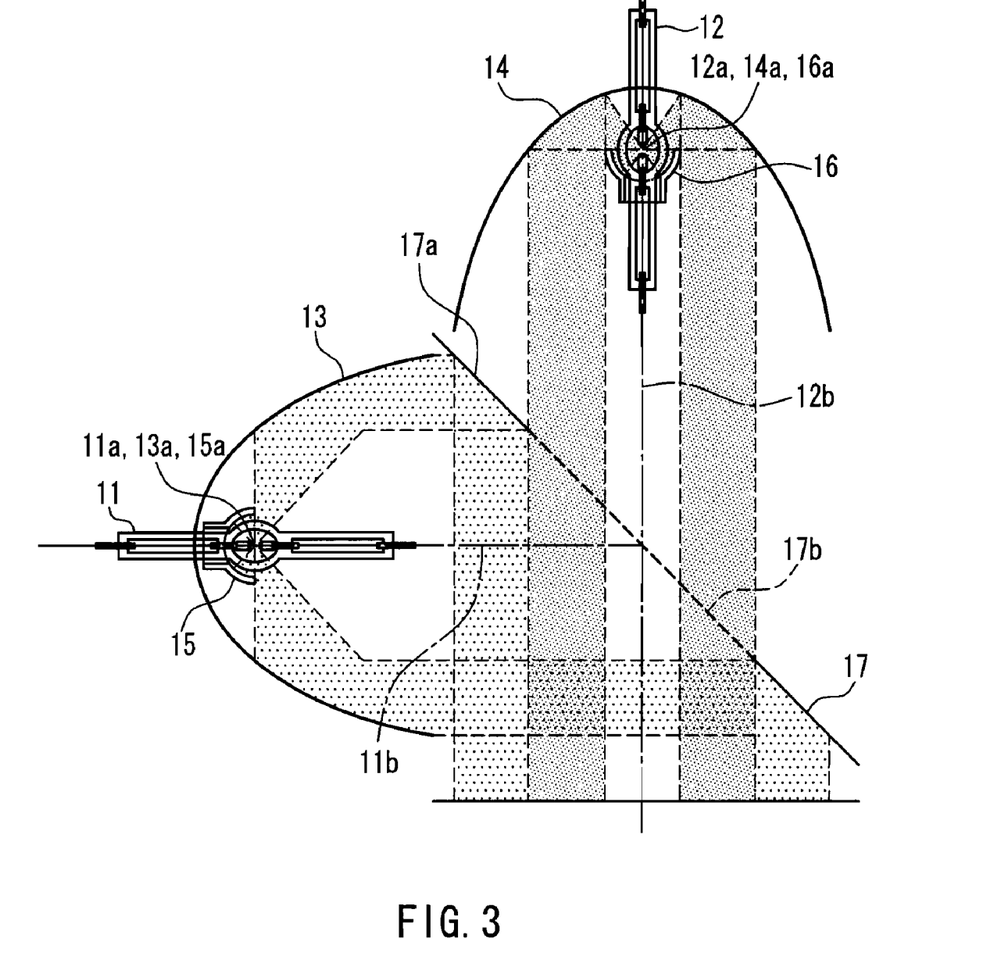
FIG. 3 is a cross-sectional view schematically showing the configuration of a light source device according to Embodiment 2 of the present invention.

FIG. 3 is a configuration diagram showing a light source device according to Embodiment 2. This light source device includes first and second lamps 11 and 12, first and second parabolic mirrors 13 and 14 (first and second concave mirrors), first and second aspherical mirrors 15 and 16 (third and fourth concave mirrors), and a plane mirror 17.

The first lamp 11, the first parabolic mirror 13 and the first aspherical mirror 15 make up a unit that condenses the light emitted from the first lamp 11. As the first lamp 11, it is possible to use an ultra-high pressure mercury lamp.

The first lamp 11 is disposed such that its light emission center 11a coincides substantially with a first focal point 13a of the first parabolic mirror 13. The first aspherical mirror 15 is provided on the same side as the first parabolic mirror 13, with respect to the light emission center 11a of the first lamp 11. The first aspherical mirror 15 has a center 15a located so as to coincide substantially with the light emission center 11a, and reflects light beams emitted from the first lamp 11 that have an emission angle within the range of approximately 90 degrees. Consequently, of the light beams emitted from the first lamp 11, those light beams incident on the first aspherical mirror 15 are reflected, so as to be incident on the first parabolic mirror 13.

Similarly, the second lamp 12, the second parabolic mirror 14 and the second aspherical mirror 16 make up a unit that condenses the light emitted from the second lamp 12.

As the second lamp 12, it is possible to use the same ultra-high pressure mercury lamp as the first lamp 11. As the second parabolic mirror 14, and the second aspherical mirror 16, it is possible to use the same parabolic mirror and aspherical mirror as the first parabolic mirror 13 and the first aspherical mirror 15.

The second lamp 12 is disposed such that its light emission center 12a coincides substantially with a first focal point 14a of the second parabolic mirror 14. The second aspherical mirror 16 is provided on the opening side that is the opposite side from the second parabolic mirror 14, with respect to the light emission center 12a of the second lamp 12. The second aspherical mirror 16 has a center 16a located so as to coincide substantially with the light emission center 12a, and reflects light beams emitted from the second lamp 12 that have an emission angle within the range of up to approximately 90 degrees. Consequently, of the light beams emitted from the second lamp 12, those light beams incident on the second spherical mirror 16 are reflected, so as to be incident on the second parabolic mirror 14.

With the above-described configuration, the first parabolic mirror 13 condenses the light emitted from the first lamp 11 and the light reflected at the aspherical mirror 15 into parallel light beams. Similarly, the second parabolic mirror 14 condenses the light emitted from the second lamp 12 and the light reflected at the second aspherical mirror 16 into parallel light beams.

The optical axis lib of the first lamp 11 and the optical axis 12b of the second lamp 12 are substantially orthogonal, and, at the position at which the optical axes 11b and 12b intersect, the plane mirror 17 is disposed so that it is inclined in a direction at substantially 45 degrees relative to the optical axes 11b and 12b.

A reflective film 17a is vapor-deposited on the plane mirror 17, and the light exiting from the first parabolic mirror 13 is reflected at the plane mirror 17, so that the optical axis 11b is bent in a direction at substantially 90 degrees.

On the other hand, a light-transmitting portion 17b where the reflective film 17a is not vapor-deposited is provided at a part of the plane mirror 17, and the light exiting from the second parabolic mirror 14 is transmitted through the light-transmitting portion 17b.

With the above-described configuration, the light beams exiting from the first parabolic mirror 13 and the second parabolic mirror 14 are combined so as to become light beams travelling substantially coaxially and in substantially the same direction.

Accordingly, the optical loss associated with the combination can be reduced, making it possible to combine and condense the light beams emitted from the first and second lamps 11 and 12 with very high efficiency.

Furthermore, by using the first and second aspherical mirrors 15 and 16, it is possible to reflect the light beams refracted in the arc tubes of the first and second lamps 11 and 12 by optimally controlling their optical paths.

In addition, it is preferable that the reflection regions of the first and second aspherical mirrors 15 and 16 have an emission angle of 90 degrees or less, relative to the light emitted from the first and second lamps 11 and 12.

Furthermore, when the reflection planes of the first parabolic mirror 13 and the second parabolic mirror 14 have an aspherical shape, it is possible to reflect light more efficiently.

It is not essential for the optical axis lib of the first lamp 11 and the optical axis 12b of the second lamp 12 to be substantially orthogonal as in the above-described configuration. There is no limitation on the intersecting angle, and an intersecting angle can be set appropriately by adjusting the inclination of the plane mirror 17 disposed between the first and second lamps 11 and 12, depending on that intersecting angle.

Furthermore, it is not essential for the first lamp 11 and the second lamp 12, the first parabolic mirror 13 and the second parabolic mirror 14, as well as the first aspherical mirror 15 and the second aspherical mirror 16, respectively, to be the same.

Also, it is not essential for the plane mirror 17 to be configured to reflect the light exiting from the first parabolic mirror 13, and to transmit the light exiting from the second parabolic mirror 14. It is also possible to change the deposition area of the reflective film 17a such that the light exiting from the parabolic mirror 13 is transmitted through, and the light exiting from the second parabolic mirror 14 is reflected.

Further, the plane mirror 17 may be provided with an opening, in place of the light-transmitting portion 17b, which is the part of the plane mirror 17 where the reflective film 17a is not vapor-deposited. In the case where the reflection and transmission of the light exiting from the first parabolic mirror 13 and the light exiting from the second parabolic mirror 14 are reversed as described above, the plane mirror 7 with a reduced size may be used. Namely, it is sufficient for the exit light to pass (i.e., to be transmitted) through, without being reflected.

As has been described above, according to the present invention, it is possible to realize a light source device having a high optical output by combining and condensing the light beams emitted from a plurality of lamps with good efficiency Embodiment 3

Figure 4A:
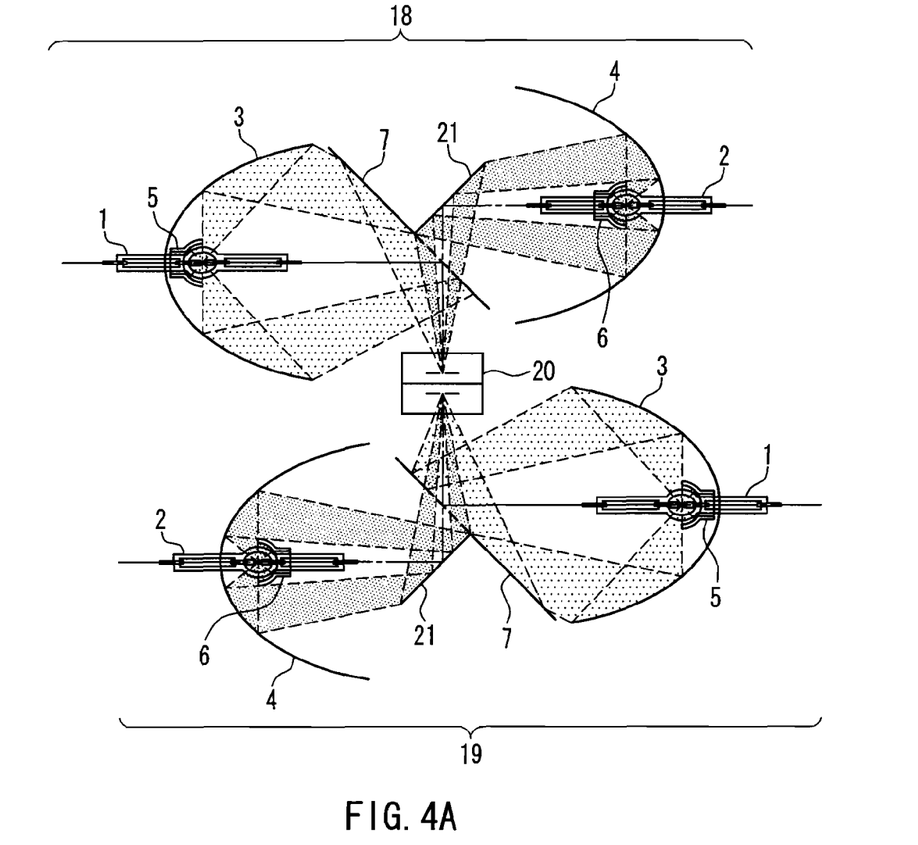
FIG. 4A is a cross-sectional view schematically showing the configuration of a light source device according to Embodiment 3 of the present invention.
Figure 4B:
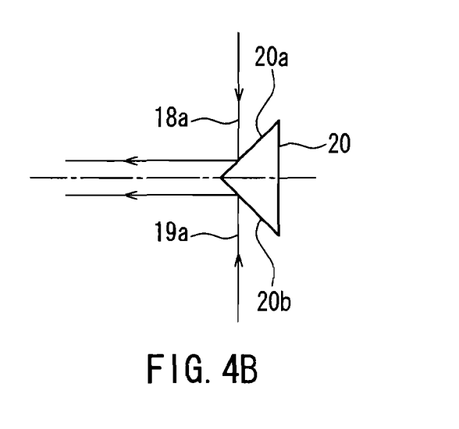
FIG. 4B is a side view showing a part of FIG. 4A.

FIG. 4A is a plan view showing the configuration of a light source device according to Embodiment 3. This light source device includes a first light source unit 18, a second light source unit 19, and a light-combining unit 20. FIG. 4B is a side view of the light-combining unit 20.

Basically, both the first light source unit 18 and the second light source unit 19 have the same configuration as that of the light source device shown in FIG. 1, and include first and second lamps 1 and 2, first and second ellipsoidal mirrors 3 and 4, first and second spherical mirrors 5 and 6, and a plane mirror 7. They differ from the device of FIG. 1 in that a plane mirror 21 is disposed in the middle of the optical path of the second ellipsoidal mirror 4, so that the optical path is bent.

The light-combining unit 20 is a rectangular prism made of quartz glass, and reflective films 20a, 20b are vapor-deposited thereon, as shown in FIG. 4B. Exiting light 18a from the first light source unit 18 and exiting light 19a from the second light source unit are condensed on the light-combining unit 20, and reflected as light beams traveling in the same direction.

With such a configuration, it is possible to realize even higher brightness by using four lamps, and to make the overall configuration compact.

As has been described above, according to the present invention, it is possible to realize a light source device having a large optical output by combining and condensing the emitted light beams from a plurality of lamps with good efficiency Also for the light source device according to this embodiment, it is not necessary to use the same lamps, ellipsoidal mirrors, spherical mirrors, and the like, as in the above-described embodiments, and there is no limitation with respect to the arrangement of the light source.

Embodiment 4

Figure 5:
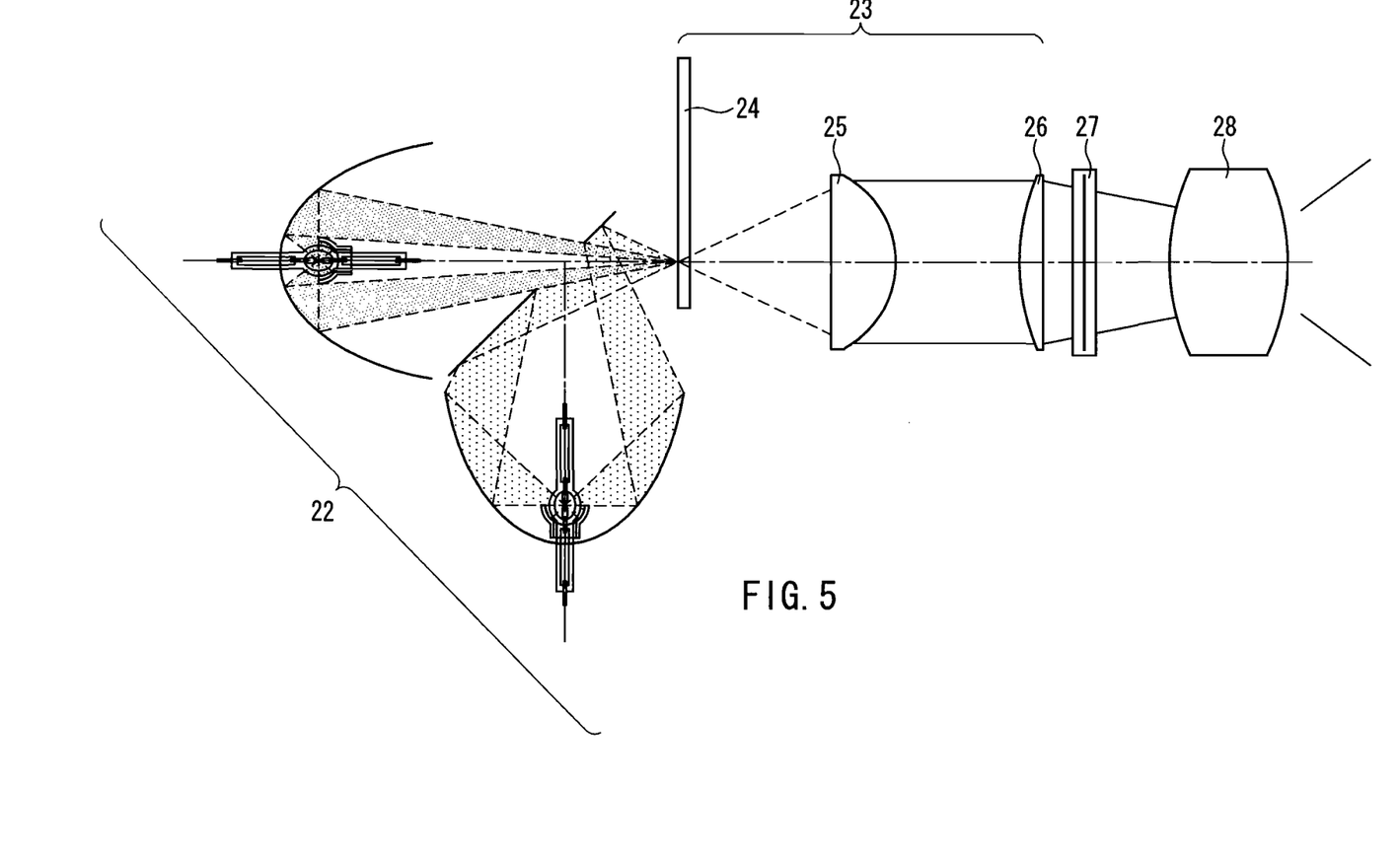
FIG. 5 is a cross-sectional view schematically showing the configuration of a projection display device according to Embodiment 4 of the present invention.

FIG. 5 is a cross-sectional view showing a projection display device according to Embodiment 4. This projection display device includes a light source device 22, an illumination device 23, a spatial light modulation element 27, and a projection lens 28.

The light source device 22 is similar to the light source device according to Embodiment 1 shown in FIG. 1, and combines and condenses the light beams emitted from a plurality of lamps efficiently.

The illumination device 23 includes a rotating color filter 24, a condenser lens 25, and a field lens 26.

In the projection display device configured as described above, the light exiting from the light source device 22 is condensed onto the rotating color filter 24. The rotating color filter 24 is formed by attaching together in the form of a disc a red transmission filter, a green transmission filter and a blue transmission filter that transmit red, green and blue bands, and is rotated by a motor (not shown).

Of the light beams condensed by the light source device 22 using the rotating color filter 24, the light beams of red, green and blue bands are transmitted selectively on a time-series basis, and sequentially incident on the condenser lens 25. The condenser lens 25 converts divergent light beams transmitted through the rotating color filter 24 into substantially parallel light beams, thereby forming illumination light.

The spatial light modulation element 27 can be configured, for example, with a transmissive liquid crystal panel, and it receives the illumination light, and forms an optical image as a change in transmittance in accordance with a video signal. The projection lens 28 projects the optical image formed on the spatial light modulation element 27 onto a screen. The field lens 26 is used to cause the illumination light to be incident efficiently on the projection lens 28.

As has been described above, according to this embodiment, it is possible to realize a very bright projection display device by using the light source device 22 capable of efficiently combining light beams emitted from a plurality of lamps.

It should be noted that not only the light source device of Embodiment 1, but also the light source devices of the other embodiments can be used as needed for the projection display device according to this embodiment.

Furthermore, a configuration is possible in which the projection display device of this embodiment is housed in a cabinet to form a rear projection display device for observing a display image via a transmissive screen attached to the cabinet.

In the embodiments described above, the spatial light modulation element is not limited to a transmissive liquid crystal panel, and it is possible to use a DMD (Digital Micromirror Device), a reflective liquid crystal panel, or the like.

In the embodiments described above, the lamps are not limited to ultra-high pressure mercury lamps, and it is also possible to use xenon lamps, LEDs, or laser light sources.

INDUSTRIAL APPLICABILITY

The light source device according to the present invention can coaxially combine light beams emitted from a plurality of lamps, so that the optical loss associated with the combination can be reduced, making it possible to increase the brightness efficiently. Therefore, the light source device of the invention is useful as a light source for a projection display device such as a projector.

The invention claimed is:

1. A light source device comprising:
   first and second lamps;
   first and second concave mirrors provided corresponding respectively to the first and second lamps;

third and fourth concave mirrors provided corresponding respectively to the first and second lamps; and a plane mirror disposed between the first and second lamps, wherein the third concave mirror is provided on the same side as the first concave mirror with respect to a light source center of the first lamp and at a position closer to the light source center of the first lamp than the first concave mirror, and reflects a part of light emitted from the first lamp toward the first concave mirror, the fourth concave mirror is provided on an opening side of the second concave mirror with respect to a light source center of the second lamp and at a position closer to the light source center of the second lamp than the second concave mirror, and reflects a part of light emitted from the second lamp toward the second concave mirror, the first concave mirror condenses light emitted from the first lamp and light reflected at the third concave mirror, the second concave mirror condenses light emitted from the second lamp and light reflected at the fourth concave mirror, the first concave mirror and the second concave mirror are arranged such that optical axes of reflected light beams thereof intersect with each other, the plane mirror either reflects light exiting from the first concave mirror, while transmitting light exiting from the second concave mirror, or transmits light exiting from the first concave mirror, while reflecting light exiting from the second concave mirror, light beams exiting from the first and second concave mirrors are combined by the plane mirror so as to become light beams travelling coaxially and in the same direction, and the first concave mirror and the second concave mirror have the same shape, and the third concave mirror and the fourth concave mirror have the same shape.

2. The light source device according to claim 1, wherein the first and second concave mirrors are ellipsoidal mirrors.

3. The light source device according to claim 1, wherein the first and second concave mirrors are parabolic mirrors.

4. The light source device according to claim 1, wherein the first and second concave mirrors each have a reflection plane having an aspherical shape.

5. The light source device according to claim 1, wherein the first and second lamps are discharge lamps, and an arc tube constituting each of the discharge lamps has an outer surface having an aspherical shape.

6. The light source device according to claim 1, wherein the first and second lamps are discharge lamps, the third and fourth concave mirrors are each configured with a reflective film vapor-deposited on an outer surface of an arc tube constituting each of the discharge lamps.

7. The light source device according to claim 1, wherein the third and fourth concave mirrors are spherical mirrors.

8. The light source device according to claim 1, wherein the third and fourth concave mirrors each have a reflection plane having an aspherical shape.

9. The light source device according to claim 1, wherein a light emission center of the first lamp, a first focal point of the first concave mirror and a center of the third concave mirror coincide together, and a light emission center of the second lamp, a first focal point of the second concave mirror and a center of the fourth concave mirror coincide together.

10. The light source device according to claim 1, wherein the first and second concave mirrors have second focal points that coincide with each other.

11. A light source device comprising:

a plurality of light source units each configured as the light source device according to claim 1; and further comprising a light-combining unit that combines light beams exiting from the plurality of light source units so as to become light beams traveling in the same direction.

12. The light source device according to claim 11, wherein the light-combining unit is configured with a prism.

13. A projection display device comprising:

the light source device according to claim 1;

an illumination device that condenses light exiting from the light source device, thereby forming illumination light;

a spatial light modulation element on which the illumination light is incident, and that modulates the incident light in accordance with a video signal; and a projection lens that projects light that has been modulated with the spatial light modulation element onto a screen.

* * * * *